United States Patent [19]
Foster

[11] 3,754,733
[45] Aug. 28, 1973

[54] TENSIONING DEVICE

[76] Inventor: Howard F. Foster, 4500 Cavendish Cir., Fort Lauderdale, Fla. 33309

[22] Filed: May 1, 1972

[21] Appl. No.: 248,892

[52] U.S. Cl............... 254/161, 24/269, 248/361 A, 242/96
[51] Int. Cl....................... A63b 61/04, B65d 63/00
[58] Field of Search........................ 254/51, 52, 161; 24/68 D, 68 R, 19, 71.2, 269; 140/93.2, 108; 248/361 A, 161; 242/96, 107.6

[56] References Cited
UNITED STATES PATENTS

| 3,638,912 | 2/1972 | Moreno | 254/161 |
| 3,416,763 | 12/1968 | Moreno | 254/161 |
| 3,673,642 | 7/1972 | Marwell | 254/161 |
| 3,416,763 | 12/1968 | Moreno | 248/361 A |
| 3,652,027 | 3/1972 | Wong | 242/96 |

Primary Examiner—Othell M. Simpson
Assistant Examiner—Robert C. Watson
Attorney—John H. Oltman et al.

[57] ABSTRACT

In a tensioning device for a flexible element including a stem and a frame having spaced, parallel legs with axially aligned openings therein, the combination therewith of a lip projecting outward from one of the legs adjacent to the opening therein, an apertured bolt extending through the openings and having an enlargement with a flat side to bear against the lip for locking the bolt against rotation, and means at the other end of the bolt to retain it against axial movement. Another opening is provided adjacent the lip to receive a portion of the enlargement.

8 Claims, 10 Drawing Figures 3,754,733

TENSIONING DEVICE

BACKGROUND OF THE INVENTION

Certain known tensioning devices for tensioning flexible elements such as straps, belts, wires, cables and the like have included a stem and a frame having spaced, parallel legs with axially aligned openings therein which have had a non-round shape that is usually a square shape. A bolt goes through the openings, and it has a portion with a square shape corresponding to the openings so that it can be axially shifted into one of the openings. A fracturable washer has been provided adjacent the square portion of the bolt to keep it out of the corresponding square opening until sufficient pressure is applied to fracture the washer. Such a fracturable washer has proved to be unnecessary.

SUMMARY OF THE INVENTION

The present invention improves known tensioning devices having legs with axially aligned openings therein by providing rounded openings in the legs and combining therewith a lip projecting outward from one of the legs adjacent the opening therein. An apertured bolt extends through the round openings and has an enlargement with a flat side to bear against the lip for locking the bolt against rotation. Means such as a nut is provided at the other end of the bolt to retain the bolt against axial movement. When the nut is loosened, the bolt is shiftable axially in the openings from a position wherein the non-round portion is outside the lip to a position wherein the non-round portion is under the lip with the flat surface locked against the lip. Because of the locking of the flat surface against the lip, the bolt will not rotate. The nut may be tightened to keep the bolt from shifting axially and thus prevent the enlargement from moving out from under the lip. The round holes are smaller than the enlargement to keep the enlargement out of the adjoining hole. Thus no fracturable washer is necessary to keep the head out of the hole. Another opening is provided next to the lip for receiving a corner of the enlargement so that it does not bind.

The invention will be described with reference to the accompanying drawings.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
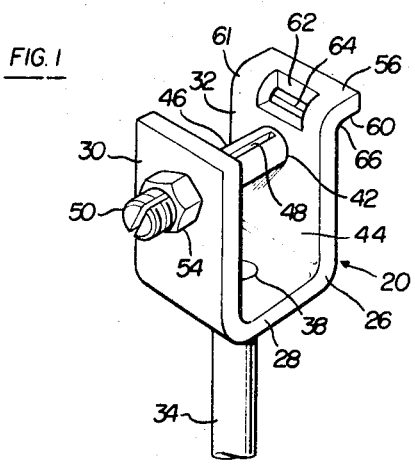
FIG. 1 is a perspective view of a tensioning device in accordance with one embodiment of the invention.
Figure 6:
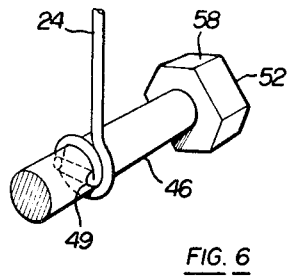
FIG. 6 is a fragmentary view of a modification wherein the strap is replaced by a wire or cable.
Figure 2:
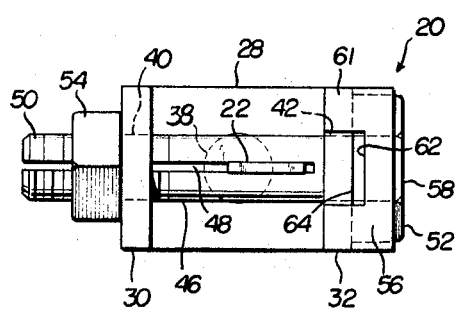
FIG. 2 is a top plan view of the tensioning device of FIG. 1.
Figure 3:
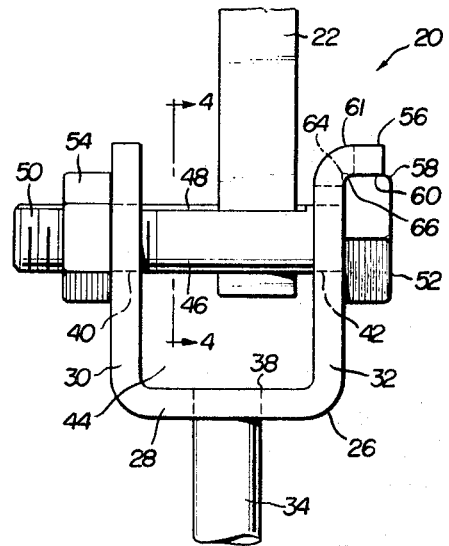
FIG. 3 is a front elevational view of the tensioning device of FIG. 1.
Figure 4:
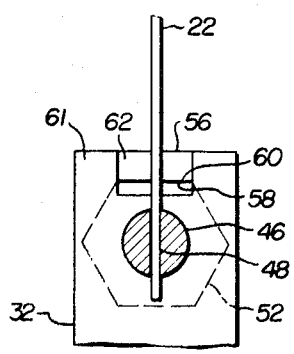
FIG. 4 is a cross sectional view taken along line 4—4 of FIG. 3 and looking in the direction of the arrows.
Figure 5:
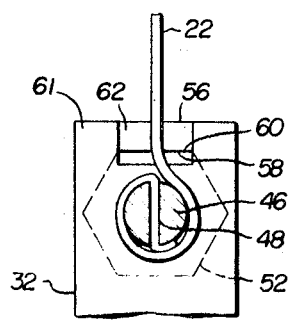
FIG. 5 is a view similar to FIG. 4 but showing a portion of a flexible element wound around the bolt.
Figure 7:
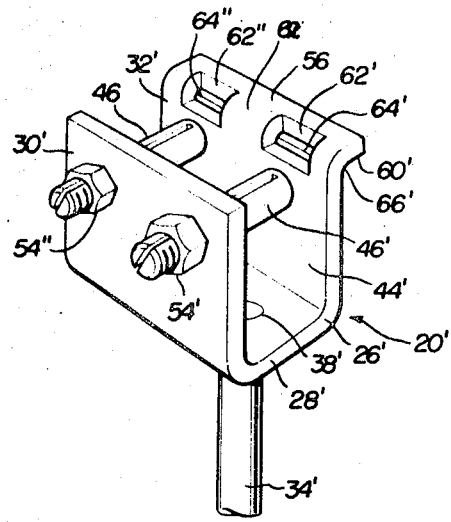
FIG. 7 is a perspective view of a tensioning device in accordance with another embodiment of the invention in which two apertured bolts are retained in a frame.
Figure 8:
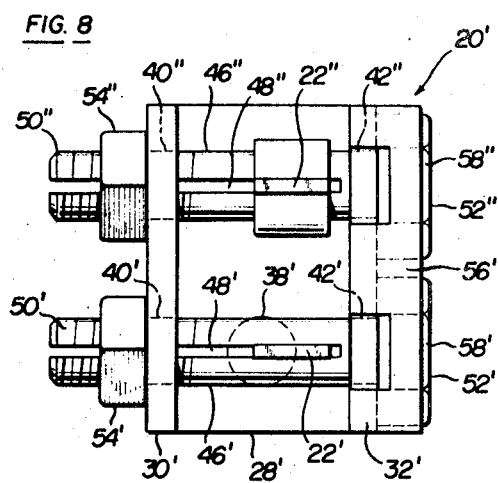
FIG. 8 is a top plan view of the embodiment of FIG. 7.
Figure 9:
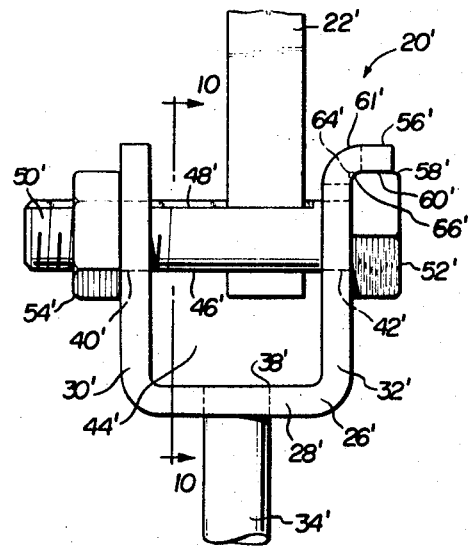
FIG. 9 is a front elevational view of the embodiment of FIG. 7.
Figure 10:
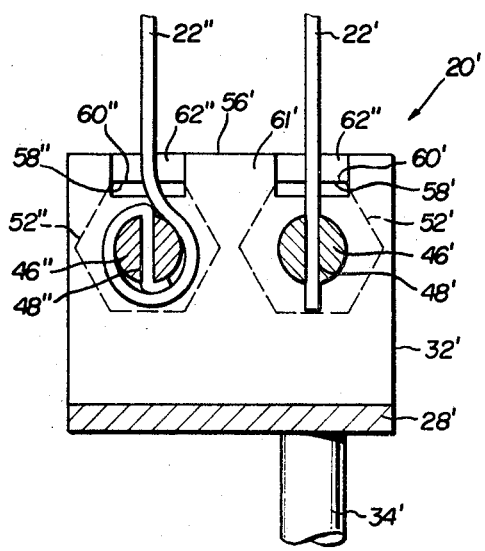
FIG. 10 is a sectional view taken along line 10—10 of FIG. 9 and looking in the direction of the arrows.

The tensioning device 20 is useful for tensioning flexible elements such as the strap or belt 22 shown in FIGS. 2–5, or the wire 24 shown in FIG. 6. Cable can be tensioned as well.

The flexible element may be a tie-down for a trailer, by way of example. The device 20 is ordinarily made entirely of metal.

The device 20 includes a substantially U-shaped frame 26 having a base 28 and two spaced, substantially parallel legs 30 and 32 extending perpendicularly from the base 28. A stem 34 is affixed by welding to the base in an opening at 38. The stem 34 could be threadably attached to the base 28. The lower end of the stem 34 is not shown, but it ordinarily carries a screw anchor which can be embedded in the ground. Alternatively, the lower end of the stem may be threaded to screw into a separate anchor.

The legs 30 and 32 respectively have round openings 40 and 42 which are aligned axially with each other across the space 44 between the legs. An apertured bolt 46 can be inserted into the openings 40 and 42 to extend through the openings with the aperture 48 thereof between the openings. The aperture 48 may be a slot as in the embodiment of FIGS. 1–5 or a smaller opening 49 as shown in FIG. 6 where a wire or cable is received in the opening.

The bolt 46 has threads 50 at the left end as viewed in the drawings and an enlarged head 52 at the right end as viewed in the drawings. The head 52 may have several flat surfaces 58, six being shown. A nut 54 screws onto the threads 50 and may be drawn tight against the leg 30 so that the head 52 is pulled against the other leg 32. This keeps the bolt from shifing axially in the openings 40 and 42. However, the nut 54 is initially loose on the far left end of the bolt 46 or off the bolt. The upper end of the right leg 32 is bent over at a right angle to provide a lip 56 which projects outward from and perpendicular to the leg 32. The lip 56 serves as a locking means for the head 52 as will be explained.

The stem 34 with its screw anchor (not shown) may be screwed down into the ground to retain the device in a fixed position. The bolt 46 is inserted in the openings 40 and 42. Note that the openings 40 and 42 are smaller than the head 52, so the head cannot enter the adjoining opening. The head has an initial position out from underneath the lip 56, and in this position, the bolt may be rotated by applying a wrench to the head 52 and turning the head. The strap 22 is inserted in the slot 48, or the wire or cable 24 is inserted in the opening 49, and the bolt is turned to wind the strap, cable or wire around the bolt in the manner shown in FIGS. 4, 5 and 6. This tensions the strap, cable or wire which is anchored at the upper end. The head of the bolt is positioned so that one of its flat surfaces, such as surface 58, is parallel with the undersurface of the lip 56. The bolt is then shifted to the left to move the head 52 under the lip 56 with the surface 58 bearing against the undersurface of the lip 56 to lock the bolt against rotation. Thus, the strap, cable or wire cannot unwind from the bolt. The nut 54 is then tightened against leg 30 to keep the head 52 from shifting out from under the lip 56.

The undersurface 60 of the lip 56 is spaced from the axis of the opening 42 by a distance which is substantially equal to a radius fo the head 52 that is perpendicular to the flat surface 58. The openings 40 and 42 are only slightly larger than the diameter of the bolt so that the bolt will shift axially in the openings but will not have a great deal of play radially. When the head 52 is under the lip 56, the lower surface of the bolt bears against the bottom on the opening 42.

A significant feature is that the bend portion 61 between the lip 56 and the main body of the leg 32 has a further opening 62 in it. This opening 62 is slightly wider than the flat surface 58 so that the corner edge 64 of the head 52 can project into the opening 62 when the head 52 is under the lip 56. Thus, the corner edge 64 does not bind against the bend surface 66.

It may be noted that when the head 52 is out from under the lip 56 and a wrench is used for turning the head, the head is clear of the lip 56 and does not interfere with the lip. If the head should accidentally slip under the lip 56 prematurely, the left end of the bolt can be struck to force the head 52 back out from under the lip 56.

Another embodiment of the invention is illustrated in FIGS. 7 through 10. This embodiment is identical to the embodiment of FIGS. 1–5 except that there are two bolts 46' and 46" and corresponding provisions for receiving and retaining the two bolts. Since the embodiment of FIGS. 7–10 is very nearly identical to the embodiment of FIGS. 1–5 except for the extra bolt, the same reference numerals are used for like parts except that prime and double prime designations are used as appropriate.

It will be apparent to those skilled in the art that modifications of the invention may be made within the scope of the following claims.

Having thus described my invention, I claim:

1. In a tensioning device for flexible elements such as straps, belts, wires, cables and the like having a stem, a substantially U-shaped frame with spaced, substantially parallel legs respectively having openings which are aligned with each other across the space between the legs, and an apertured bolt to extend through said openings with an aperture thereof between said legs to receive the end of a flexible element to be wrapped around the bolt for tensioning, the bolt having a nut for one end thereof and a non-round portion with flats toward the other end thereof, the improvement wherein said openings are rounded and smaller than said non-round portion to keep that portion from binding therein while allowing rotation of said bolt to wind said flexible element for tensioning, and one of said legs has a lip at the free end thereof perpendicular to said one leg, said lip having an undersurface spaced from the axis of the rounded opening in said one leg by a distance substantially equal to a radius of said non-round portion perpendicular to one of said flats to receive said flat, said bolt being shiftable axially in said openings from a position wherein said non-round portion is outside said lip to a position where said non-round portion is under said lip with said flat locked against said lip.

2. The tensioning device as claimed in claim 1 in which said lip is a bent over portion of said one leg.

3. The tensioning device as claimed in claim 2 in which the bend between said lip and said one leg has a further opening for receiving a corner of said non-round portion of said bolt when said non-round portion is positioned under said lip to prevent binding of said non-round portion with said bend.

4. In a tensioning device for a flexible element having a bolt with an aperture therein to receive the end of a flexible element to be wound around the bolt and a non-round portion with flat surfaces toward one end thereof, a stem, and a frame having a base and substantially parallel legs projecting from the base, the legs having openings which are aligned with each other across the space between the legs so that the bolt is rotatable and axially adjustable in the openings, the bolt having a nut for the end thereof opposite the non-round portion, the improvement wherein one of said legs has lip means at the free end thereof perpendicular to said one leg spaced from the axis of said opening in said one leg by a predetermined distance corresponding to a radius of said non-round portion perpendicular to one of said flats so that said bolt can be shifted axially in said openings from a position wherein said non-round portion is outside said lip means to a position wherein said non-round portion is under said lip means with said flat locked against said lip means for retaining said bolt in a locked condition.

5. The tensioning device as claimed in claim 4 in which said lip means and said one leg are integral with each other and said frame has a bend between said one leg and said lip means with a cavity at said bend for receiving a corner of said non-round portion of said bolt to prevent binding of said bolt at said bend.

6. In a tensioning device for a flexible element including a stem, a frame having spaced, substantially parallel legs with each of the legs having an opening therein, the openings being aligned with each other across the space between said legs, and an apertured bolt means to extend through said openings and receive a nut at one end thereof, the other end of said bolt means having a non-round portion with flat surfaces thereon to be turned for winding the flexible element on said bolt means, the improvement wherein said openings are rounded and smaller than said non-round portion to keep that portion from binding in said openings while allowing rotation of said bolt means to wind said flexible element thereon, and one of said legs has a bent over lip projecting perpendicularly from one end thereof, said lip having an under surface spaced from the axis of the rounded opening in said one leg by a distance sufficient to receive one of said flat surfaces on said non-round portion when said non-round portion is shifted axially under said lip for retaining said bolt means in a locked condition, the nut being adjustable to keep said non-round portion under said lip.

7. The tensioning device as claimed in claim 6 in which said frame has a bend between said one leg and said lip, and said bend has a cavity therein sufficiently wide to receive an edge of said non-round portion when said non-round portion is placed under said lip towards said one leg.

8. In a tensioning device for a flexible element including a frame having spaced, parallel legs with axially aligned openings therein, the combination therewith of a lip projecting outward from one of said legs adjacent to the opening therein, an apertured bolt extending through said openings and having an enlargement with a flat side to bear against said lip for locking said bolt against rotation, and means at the other end of said bolt to retain the same against axial movement.

* * * * *